(12) United States Patent
Guenter

(10) Patent No.: US 7,274,882 B2
(45) Date of Patent: Sep. 25, 2007

(54) METHOD AND APPARATUS FOR MONITORING THE POWER LEVEL OF TWO OR MORE OPTICAL TRANSMITTERS

(75) Inventor: James K. Guenter, Garland, TX (US)

(73) Assignee: Finisar Corporation, Sunnyvale, CA (US)

( * ) Notice: Subject to any disclaimer, the term of this patent is extended or adjusted under 35 U.S.C. 154(b) by 681 days.

(21) Appl. No.: 10/283,835

(22) Filed: Oct. 30, 2002

(65) Prior Publication Data

US 2004/0213583 A1 Oct. 28, 2004

(51) Int. Cl.
*H04B 10/06* (2006.01)
*H04B 10/00* (2006.01)

(52) U.S. Cl. ............ 398/202; 398/212; 398/207; 398/140; 398/118

(58) Field of Classification Search ........ 398/118–138, 398/202, 207, 140, 212; 372/29.021, 50.21; 250/341.7, 205, 559.16, 200, 206
See application file for complete search history.

(56) References Cited

U.S. PATENT DOCUMENTS

| | | | | |
|---|---|---|---|---|
| 5,045,684 | A | | 9/1991 | Burns ............... 250/206.1 |
| 5,215,465 | A | | 6/1993 | Marshall et al. ......... 434/22 |
| 5,475,701 | A | * | 12/1995 | Hibbs-Brenner ...... 372/50.124 |
| 5,644,385 | A | | 7/1997 | Mizuno .............. 356/3.04 |
| 5,900,619 | A | * | 5/1999 | Honda et al. ........... 250/201.5 |
| 6,023,485 | A | * | 2/2000 | Claisse et al. ........... 372/50.21 |
| 6,072,761 | A | | 6/2000 | Tani ....................... 369/116 |
| 6,151,344 | A | * | 11/2000 | Kiely et al. ............ 372/38.02 |
| 6,396,570 | B2 | | 5/2002 | Takayanagi et al. ........ 356/5.01 |
| 6,633,421 | B2 | * | 10/2003 | Trezza ................... 438/24 |
| 6,890,107 | B1 | * | 5/2005 | Brophy et al. ............ 385/88 |
| 2002/0089729 | A1 | * | 7/2002 | Holcombe ............... 359/189 |
| 2003/0021327 | A1 | * | 1/2003 | Murry .................... 372/96 |

OTHER PUBLICATIONS

Burger, et al., "New Generations of Position Sensitive Silicon Detectors," Presented at MRS 1997 Fall Meeting in Boston, Massachusettes, 11 pages, Dec. 5, 1997.
Fujita, et al., "New Types of Position Sensitive Device for Accurate Sensing," 1999 International Conference on Information Intelligence and Systems, Rockville, Maryland, 8 pages, Mar. 31-Apr. 3, 1999.

* cited by examiner

*Primary Examiner*—M. R. Sedighian
(74) *Attorney, Agent, or Firm*—Workman Nydegger

(57) ABSTRACT

Methods and apparatus for monitoring the power level of one or more optical emitters are provided. In some embodiments, optical signals from two or more optical emitters are directed at different regions of a photo detector. The photo detector may include two or more spaced contacts that are adapted to receive different contributions of photo current from each of the optical signals. By monitoring the photo currents in the two or more spaced contacts, a measure of the optical power of each of the optical signals may be determined.

21 Claims, 10 Drawing Sheets

METHOD AND APPARATUS FOR MONITORING THE POWER LEVEL OF TWO OR MORE OPTICAL TRANSMITTERS

BACKGROUND OF THE INVENTION

This invention relates to the field of optical systems, and more particularly to methods and apparatus for monitoring the power of multiple optical systems.

Various forms of optoelectronic devices have been developed and have found widespread use including, for example, semiconductor lasers, semiconductor photodiodes, semiconductor photo detectors, etc. For some applications, an optoelectronic emitter such as a semiconductor laser is coupled to an optoelectronic detector (e.g., photodiode or Resonant Cavity Photo Detector) through a fiber optic link, free space, etc. These configurations provide a high-speed communication path, which, for many applications, can be extremely beneficial. Optoelectronic emitters and detectors may also be used in a wide variety of other applications including, for example, writing/reading data in recorded media applications, performing assay analysis on chemical and biological materials, and many others.

It is known that the power of many optoelectronic emitter(s) tend to vary over time. A variety of reasons contribute to this including, for example, changing operating conditions such as operating voltage, operating temperature, as well as device degradation or failure, etc. For many applications, it is desirable to maintain a specific, constant or at least known optical output power, as this can significantly increase the reliability and/or accuracy of the system. For example, in optical communications applications, if the power of one or more of the data channels falls outside of a desired range, the reliability of the communications link can significantly degrade. In some systems, it is possible to provide a separate detector to monitor the optical output power of each optoelectronic emitter. However, this is not always possible, and in many cases, can add significant cost to the system. For example, providing a separate photodiode for each optoelectronic emitter in an optoelectronic emitter array can significantly increase the pitch of the array because of increased active area and increased wiring congestion.

SUMMARY OF THE INVENTION

The present invention provides methods and apparatus for simultaneously monitoring the output power of one or more optical signals. Generally, this may be accomplished by providing at least a portion of the optical signals provided by optical emitters to a common photo detector. In some embodiments, each of the optical signals is primarily directed at a different area or region of the photo-sensitive region of the photo detector. When so provided, the photo detector may produce a photo induced current in two or more spaced contacts, where each of the optical signals contributes a different amount to the photo induced current in each of the two or more contacts.

A controller may analyze the photo currents that pass through each of the two or more contacts of the photo detector, and the relative power of each of the optical signals may be determined. This may be useful to, for example, identify variations in the output power of specific optical emitters. In some embodiments, the controller may adjust the optical power of the optical emitters so that the optical power of each of the optical signals remains within a predetermined range. Alternatively, or in addition, the controller may analyze the total current that passes through the two or more contacts to determine the total or collective power of all of the optical signals. This may be useful to, for example, identify global changes in output power. Global changes in output power may occur when, for example, a temperature change occurs affecting the output performance of all optical emitters. The controller may adjust the optical power of the optical emitters so that the optical power of the optical signals remains within a predetermined range.

In some embodiments, a light director may be used to direct at least a portion of each of the two or more optical signals to the photo detector. The director may include, for example, a partially or fully reflective mirror, a light diffraction element, and/or any other suitable light directing element or elements. When the optical emitters and the photo detector are formed on a common substrate, the director may include, for example, a partially reflective mirror that is spaced above the substrate that reflects at least a portion of the optical signals back toward the substrate and to the photo detector. The remaining portion of the optical signals may pass through the partially reflective mirror to be used for other purposes. It is recognized that any suitable light director configuration may be used, and in some cases, a light director may not be necessary at all.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
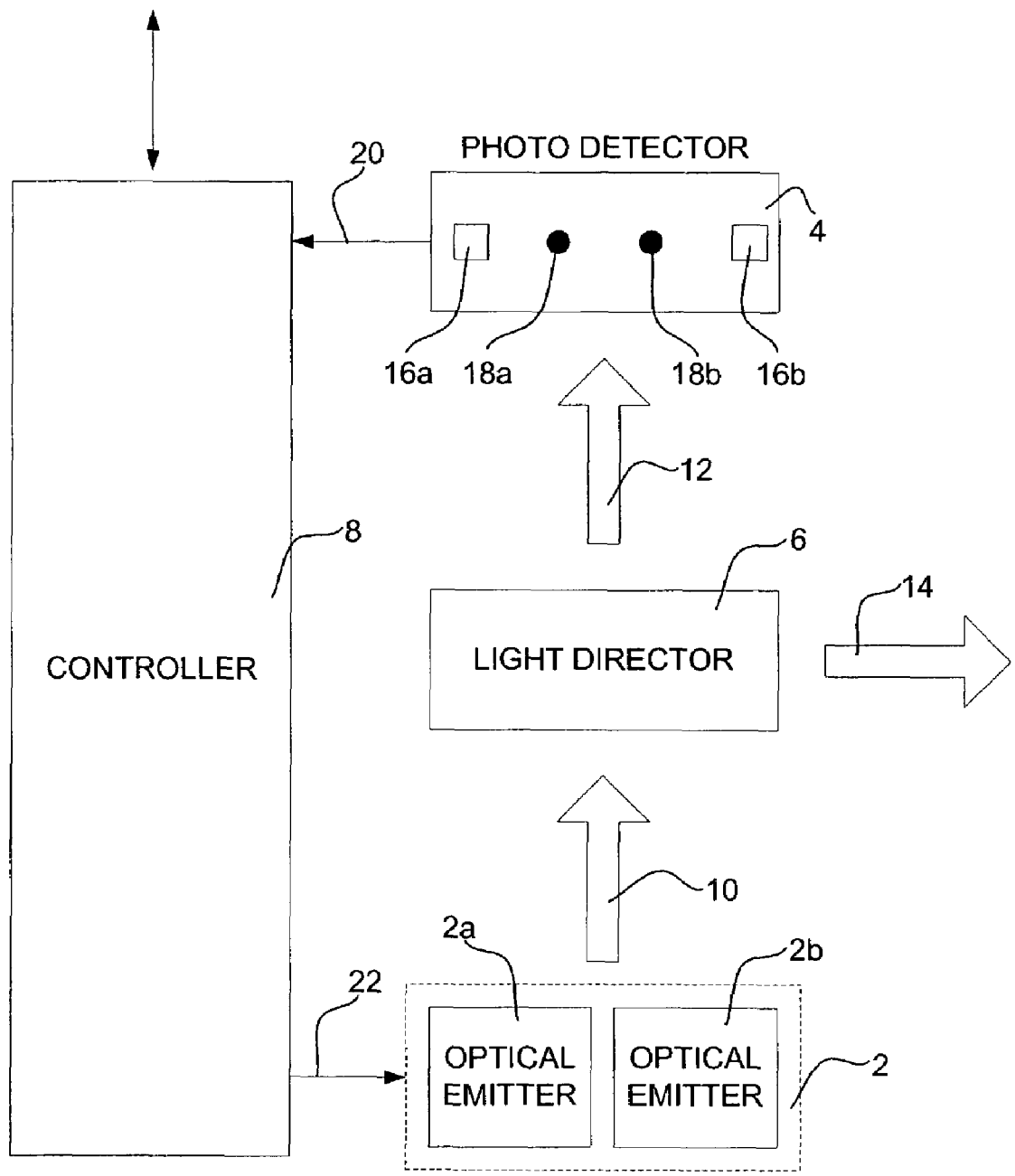
FIG. 1 is a schematic block diagram of an illustrative embodiment of the present invention.

FIG. 1 is a block diagram showing an illustrative embodiment of the present invention. The illustrative embodiment includes two or more optical emitters generally shown at 2, a photo detector 4, a light director 6 and a controller 8. Each of the two or more optical emitters 2a and 2b may provide an optical signal, collectively shown at 10, to the light director 6. The light director may direct at least a portion 12 of the optical signals 10 to photo detector 4. The remaining portion 14 of the optical signals may be passed to another location for other purposes, such as to an optical transmitting medium or the like.

The optical emitters 2a and 2b may be Vertical Cavity Surface Emitting Lasers (VCSEL), and the photo detector 4 may be a Resonant Cavity Photo Detector (RCPD), all formed on a common substrate. It is contemplated, however, that the optical emitters 2a and 2b may be, for example, LEDs or any other suitable optical emitters, and need not be formed on a common substrate with the photo detector 4. Likewise, the photo detector 4 may be any suitable photo detector. In some embodiments, the photo detector 4 preferably includes a photo sensitive region with two or more spaced contacts, wherein the photo current that passes through a particular contact is dependent on the position or location of the incident optical signal or signals. In many cases, the photo detector 4 may include a PN junction, with two or more spaced contacts 16a and 16b electrically connected to one side of the PN junction and at least one other contact (not shown in FIG. 1) electrically connected to the other side of the PN junction. Each of the optical signals 10 may then be primarily directed at a different region of the photo-sensitive area of the photo detector 4. For example, the optical signal provided by optical emitter 2a may be primarily directed at region 18a of photo detector 4, and the optical signal provided by optical emitter 2b may be primarily directed at region 18b of photo detector 4. The resistance between the different regions 18a and 18b of the photo detector 4 and the two or more contacts 16a and 16b may be different, which when so provided, may cause each of the optical signals to produce a different contribution to the photo induced current in each of the two or more contacts 16a and 16b.

The controller 8 may receive a measure of the photo induced current in each of the two or more contacts 16a and 16b via communications path 20. The controller 8 may then determine a measure of the optical power of at least selected optical signals 10. This may be accomplished by, for example, calculating one or more differences or ratios of the photo induced currents in the two or more contacts 16a and 16b. These differences or ratios may be correlated to a particular optical signal or optical emitter 2. This may be useful in, for example, identifying variations in the output power of specific optical emitters 2. In some cases, the controller 8 may adjust the optical power of selected optical emitters 2 via communications path 22 to keep the optical power of each of the optical signals 10 within a predetermined range.

Alternatively, or in addition, the controller 8 may analyze the total current that passes through the two or more contacts 16a and 16b to determine the total or collective power of all of the optical signals 10. This may be useful in, for example, identifying global changes in output power. Global changes in output power may occur when, for example, a temperature change occurs affecting the output performance of all optical emitters 2. In some cases, the controller 8 may adjust the optical power of the optical emitters 2 so that the optical power of the optical signals 10 remains within a predetermined range.

Figure 2:
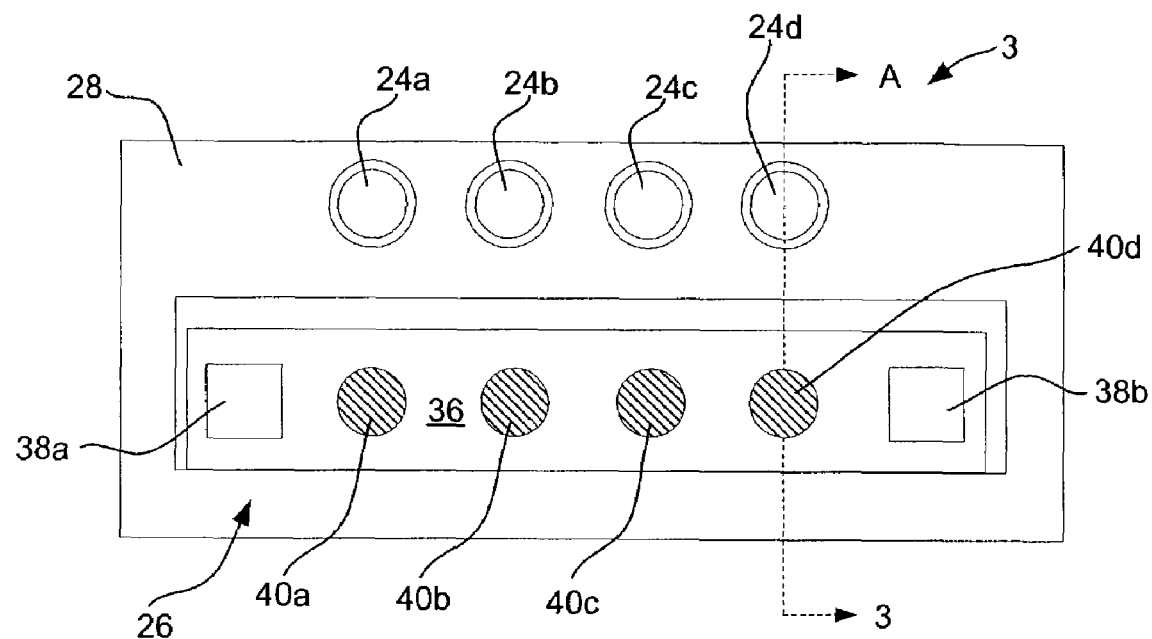
FIG. 2 is a top view of an array of optical emitters positioned adjacent an elongated photo detector in accordance with an illustrative embodiment of the present invention.
Figure 3:
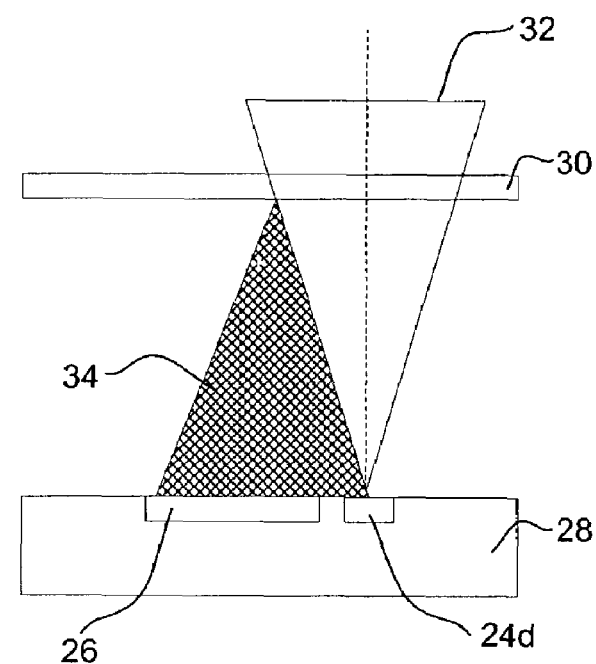
FIG. 3 is a schematic cross-sectional side view of the illustrative embodiment of FIG. 2, taken along line 3-3.

FIG. 2 is a top view of an array of optical emitters 24a-24d positioned adjacent an elongated photo detector 26 in accordance with an illustrative embodiment of the present invention. FIG. 3 is a schematic cross-sectional side view of the illustrative embodiment of FIG. 2 taken along line 3-3. In the illustrative embodiment shown, the array of optical emitters 24a-24d and the elongated photo detector 26 are situated on a common substrate 28, but this is not required.

During use, each of the optical emitters 24a-24d may produce an optical signal 32 in a vertical direction (i.e. out of the paper). As best shown in FIG. 3, a light director 30 may then be positioned above the substrate 28 to direct at least a portion 34 of each of the optical signals 32 back toward the photo detector 26. The light director 30 may include, for example, a partially or fully reflective mirror, a light diffraction element, and/or any other suitable light directing element or elements as desired. In the illustrative embodiment, the light director 30 is a partially reflective mirror with the remaining portion of the optical signals 32 passing through the light director 30 to, for example, a light transmitting medium (not shown) such as an optical fiber. In some embodiments, a surface of a light transmitting medium itself may serve as the light director 30. In any event, it is contemplated that any suitable light director configuration may be used.

The photo detector 26 may be, for example, an elongated PN type diode or any other suitable photo detector. Preferably, the photo detector 26 includes a photo sensitive region 36 with two or more spaced contacts electrically connected to the photo sensitive region 36, such as contacts 38a and 38b. In the illustrative embodiment, the photo detector 26 includes a PN junction, with contacts 38a and 38b electrically connected to one side (e.g. the top side) of the PN junction, and at least one other contact (not shown in FIG. 2) electrically connected to the other side (e.g. bottom side) of the PN junction.

Each of the optical signals 32 provided by the optical emitters 24a-24d is preferably primarily directed at a different region of the photo-sensitive area 36 of the photo detector 26. For example, the optical signals provided by optical emitters 24a-24d may be primarily directed at regions 40a-40d of photo detector 26, respectively. The electrical resistance of the PIN diode structure between the different regions 40a-40d of the photo sensitive area 36 and each of the contacts 38a and 38b may be different, which causes the photo currents produced by each of the optical signals 32 to contribute differently to the photo induced currents passing through each of the contacts 38a and 38b.

Figure 4:
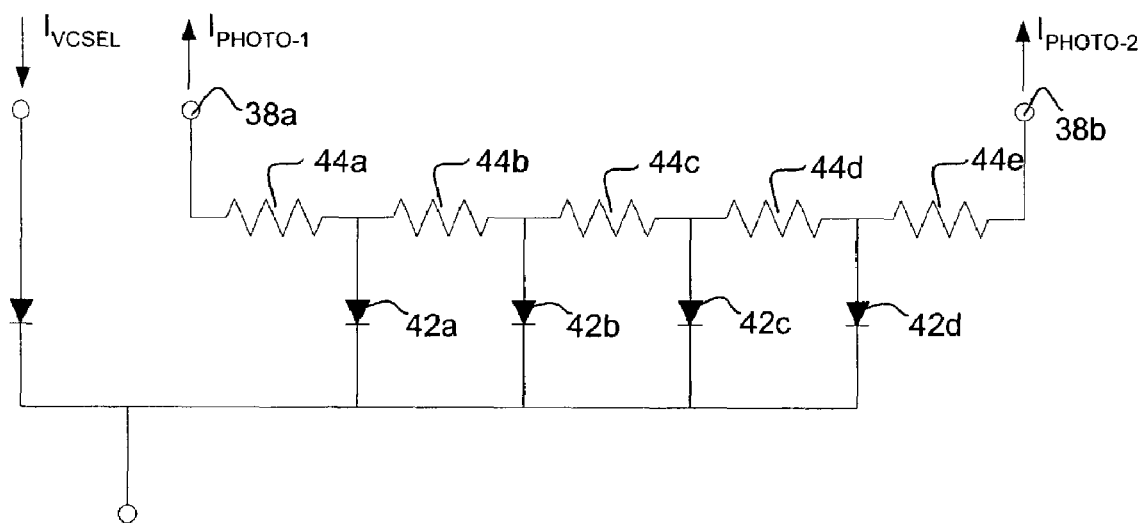
FIG. 4 is a schematic diagram showing an equivalent circuit for the illustrative embodiment of FIG. 2.

To illustrate this further, FIG. 4 show a schematic diagram of an equivalent circuit of the illustrative embodiment of FIG. 2. In a real device, each of the elements 42a-42d and 44a-44e are actually distributed, not discrete. The simplification of FIG. 4, however, reflects the performance of the real device. Photo diodes 42a-42d shown in FIG. 4 correspond to regions 40a-40d of photo detector 26, respectively. As noted above, regions 40a-40d correspond to the regions that the optical signals of optical emitters 24a-24d are primarily directed. Resistors 44a-44e represent the electrical resistance of the photo detector 26. As can be seen, and in the illustrative embodiment, more of the photo current produced by optical emitter 24a in region 40a of the photo-sensitive area 36 will tend to flow through contact 38a than contact 38b because the resistance to contact 38a is less than the resistance to contact 38b. Likewise, more of the photo current produced by optical emitter 24*d* in region 40*d* of the photo-sensitive area 36 will tend to flow through contact 38*b* than contact 38*a* because the resistance to contact 38*b* is less than the resistance to contact 38*a*.

Like above, a controller may receive a measure of the photo induced current that passes through contacts 38*a* and 38*b*, and may determine a measure of the optical power produced by each of the optical emitters 24*a*-24*d*. This may be accomplished by, for example, calculating one or more differences and/or ratios of the photo induced currents flowing through contacts 38*a* and 38*b*, and then correlating these differences and/or ratios to identify which optical emitter(s) experienced a power change, and in some cases, the extent of the power change. The controller may then adjust the optical power of selected optical emitters 24*a*-24*d* to keep the optical power of each of the optical emitters 24*a*-24*d* within a predetermined range.

Alternatively, or in addition, the controller may analyze the total current that passes through the contacts 38*a* and 38*b* to determine the total or collective power of all of the optical emitters 24*a*-24*d*. The total current passing through the at least one other contact (not shown) that is electrically connected to the other side (e.g. bottom side) of the PN junction may also be used. In any event, the total current may be used to, for example, identify global changes in output power of all optical emitters 24*a*-24*d*. Global changes in output power may occur when, for example, a temperature change occurs affecting the output performance of all optical emitters 24*a*-24*d*. In some cases, the controller may adjust the optical power of all optical emitters 24*a*-24*d* so that their optical power remains within a predetermined range. As can be seen, a single photo detector may be used to monitor the optical power output of several optical emitters, which may significantly reduce the size, power and/or cost of a system.

Figure 5:
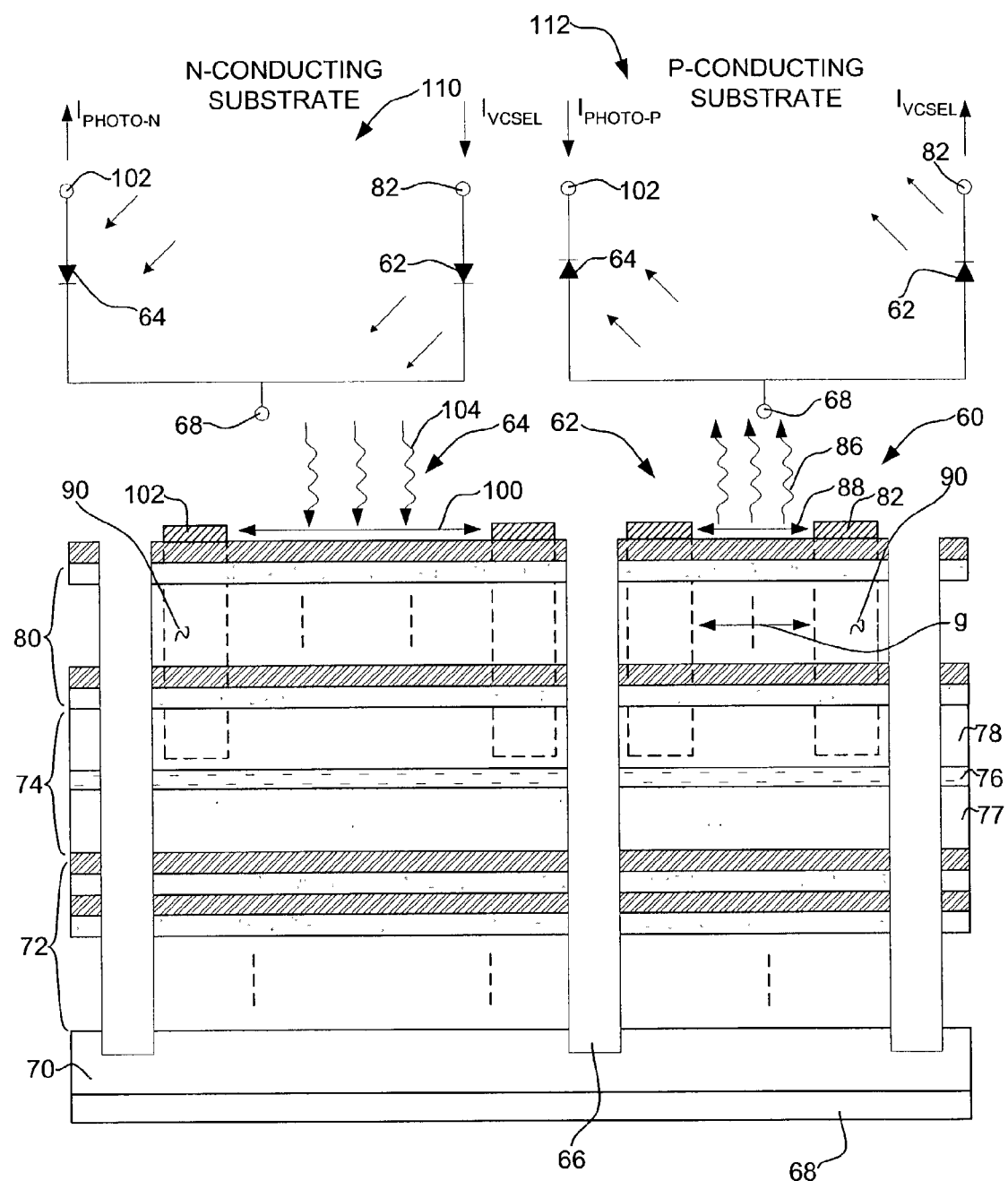
FIG. 5 is a cross-sectional side view of a Vertical Cavity Surface Emitting Laser (VCSEL) and Resonant Cavity Photo Detector (RCPD) on a conductive substrate.

FIG. 5 is a cross-sectional side view of a Vertical Cavity Surface Emitting Laser (VCSEL) and Resonant Cavity Photo Detector (RCPD) on a conductive substrate in accordance with the present invention. The structure is generally shown at 60, and includes a VCSEL 62 and a RCPD 64 fabricated as a single monolithic device. Although it is not shown in FIG. 5, in some embodiments, there may be several VCSEL devices for each RCPD 64. In the illustrative embodiment, a number of layers are formed on a conductive substrate layer 70, and both the VCSEL 62 and the RCPD 64 are formed from the same layers, as shown. This implementation may provide a highly manufacturable structure that has matched laser and photo detector characteristics (such as wavelength).

In the illustrative embodiment of FIG. 5, an n-contact 68 is formed on an n-doped gallium arsenide (GaAs) substrate 70. An n-type mirror stack 72 is then formed on substrate 70. Formed on stack 72 is a spacer 74. Spacer 74 may have a bottom confinement layer 77 and a top confinement layer 78 surrounding an active region 76. A p-type mirror stack 80 is then formed on top confinement layer 78. A p-metal layer 82 and 102 is then formed on stack 80. The emission region may have a passivation layer (not shown).

Isolation regions, for example isolation region 90, may restrict the area of current flow through the active region 76. It is contemplated that both the VCSEL 62 and the RCPD 64 may have isolation regions, as shown. In the illustrative embodiment, the isolation regions (e.g. region 90) may include a deep H+ ion implantation. Alternatively, or in addition, the isolation regions may include one or more etched channels 66 to further help electrically and optically isolated the VCSEL 62 and the RCPD 64. It is contemplated that the isolation region 66 may electrically isolate the p-type mirror region 80, and the active region 74 of the VCSEL 62, from the p-type mirror region and active region of the RCPD 64. In addition, the isolation region 66 may electrically isolate the n-type mirror region 80 of the VCSEL 62, from the n-type mirror region of the RCPD 64. In the illustrative embodiment, the isolation region 66 is shown extending down to the substrate layer 70.

Referring now specifically to VCSEL 62, the diameter "g" may be set to provide the desired active area of the VCSEL 62. The diameter 88 of the exit aperture may be smaller, larger or the same as the diameter "g" of the isolation region 90. In the illustrative embodiment of FIG. 5, the diameter 88 of the exit aperture is sized smaller than the diameter "g" of the isolation region 90. By having the diameter "w" 88 smaller than the diameter "g", the VCSEL 62 may include some level of mode control. That is, because most of the energy for higher order modes is concentrated away from the center of the lasing cavity, a reduced diameter aperture 88 may help reduce the number of modes that the laser produces at a given drive current. The diameter 88 of VCSEL 62 may be wider if mode control is not required or desired.

Spacer 74 may contain a bulk or quantum well active region disposed between mirror stacks 72 and 80. In one illustrative embodiment, quantum well active region 76 includes alternating layers of aluminum gallium arsenide (AlGaAs) barrier layers and GaAs quantum well layers. Stacks 72 and 80 are distributed Bragg reflector stacks, and may include periodic layers of doped AlGaAs and aluminum arsenide (AlAs) or of AlGaAs of any two intermediate compositions. The AlGaAs of stack 72 is doped with the same type of impurity as substrate 70 (e.g., n type), and the AlGaAs of stack 80 is doped with the other kind of impurity (e.g., p type). Alternative constructions may use mirrors composed of insulating layers, with access for electrical current supplied from the sides, by-passing the insulating layers.

Contact layer 82 may include an ohmic contact that allows appropriate electrical biasing of VCSEL 62. When VCSEL 62 is forward biased with a more positive voltage on contact 82 than on contact 68, active region 76 emits light 86, a portion of which may pass through stack 80.

Referring now specifically to RCPD 64, both the diameter 100 of the exit aperture and the diameter "g" of the isolation region may be larger, relative to VCSEL 62. This may allow more light to be coupled into RCPD 64, which may increase the sensitivity and beam alignment tolerances. Alternatively, or in addition, it is contemplated that the receiving mirror of the RCPD 64 may be less reflective than the corresponding mirror of the VCSEL 62. This may allow more light to enter the RCPD 64, which may increase the sensitivity of the RCPD 64. In one illustrative embodiment, this is accomplished by providing a different number of mirror periods for top mirror of the VCSEL device relative to the RCPD. For example, the top mirror of the RCPD 64 may have fewer mirror periods than the corresponding mirror of VCSEL 62. In some embodiments, additional mirror periods may be selectively provided to VCSEL 62. This may include, for example, additional DBR mirror periods and/or a hybrid dielectric-semiconductor mirror such as an AlGaAs/AlAs DBR mirror with a dielectric top mirror.

RCPD 64 may be more efficient than a standard photodiode because the light that enters the cavity, for example through p-type mirror stack 80, may be reflected through the active region 76 many times. That is, the light 104 may be reflected between the p-type mirror stack 80 and the n-type mirror stack 72 until the light is either absorbed by the active region 76 or until it escapes through one of the mirror stacks 72 or 80. Because the mirror stacks 72 and 80 are typically highly reflective, most of the light is eventually absorbed by the active region 76. The absorption of the light may cause electron/hole pairs to be generated within the active region 76, which when separated produced photo induced current in the RCPD.

Contact layer 102 may form ohmic contacts that allow appropriate electrical biasing of RCPD 64. When RCPD 64 is reverse biased with a more negative voltage on contact 102 than on contact 68, the photo-induced electron/hole pairs may be swept out of the active region 76, and collected by contact layer 102. Application of this external bias is not necessary for function of the RCPD 64, but may improve performance. Preferably, and in some embodiments of the present invention, the RCPD 64 includes two or more spaced contacts 102. The two or more spaced contacts 102 may be electrically connected to the top DBR mirror 80 of RCPD 64, where contact 68 is preferably electrically connected to the bottom DBR mirror 72 of the RCPD 64.

An equivalent circuit for the VCSEL and RCPD structure with an n-type conducting substrate is generally shown at 110. Rather than forming VCSEL 62 and RCPD 64 devices on an n-type conducting substrate, it is contemplated that a p-type conducting substrate may be used. In this embodiment, the conductivity types of the various layers are reversed, and an equivalent circuit for the resulting structure is generally shown at 112. In both cases, the VCSEL 62 and the RCPD 64 may share a common contact 68.

It is contemplated that in some embodiments, the VCSEL 62 may emit light in an opposite direction relative to the receiving direction of the RCPD 64. For example, in some embodiments, the VCSEL 62 may emit light in a downward direction through the substrate 70, while the RCPD 64 may receive light from an upward direction. In this embodiment, the active region 76 may include, for example, InGaAs quantum wells. InGaAs quantum wells may produce a longer wavelength light output than AlGaAs quantum wells. The GaAs substrate 70 may not absorb light having a wavelength that is produced by InGaAs quantum wells, and may pass directly through the substrate 70. Alternatively, or in addition, AlGaAs quantum wells may be used, and an exit aperture may be provided through the substrate 70 below the VCSEL 62. In any event, the light emitted by the VCSEL may be in a downward direction, and the light received by the RCPD may be from an upward direction. Likewise, it is contemplated that the light may be provided by the VCSEL and received by the RCPD from a downward direction, and the light may be provided by the VCSEL in an upward direction and received by the RCPD from a downward direction.

In yet another embodiment, the light provided by the VCSEL may be provided both in a downward direction and an upward direction by adjusting the reflectivity of the top and bottom mirrors. When so provided, the RCPD or other photo detector may be provided on one side of the VCSEL (either on the same or a separate substrate) and may receive a first optical signal from the VCSEL. The first optical signal may be used to monitor the power level of the VCSEL, while the second optical signal may be used for other purposes.

Figure 6:
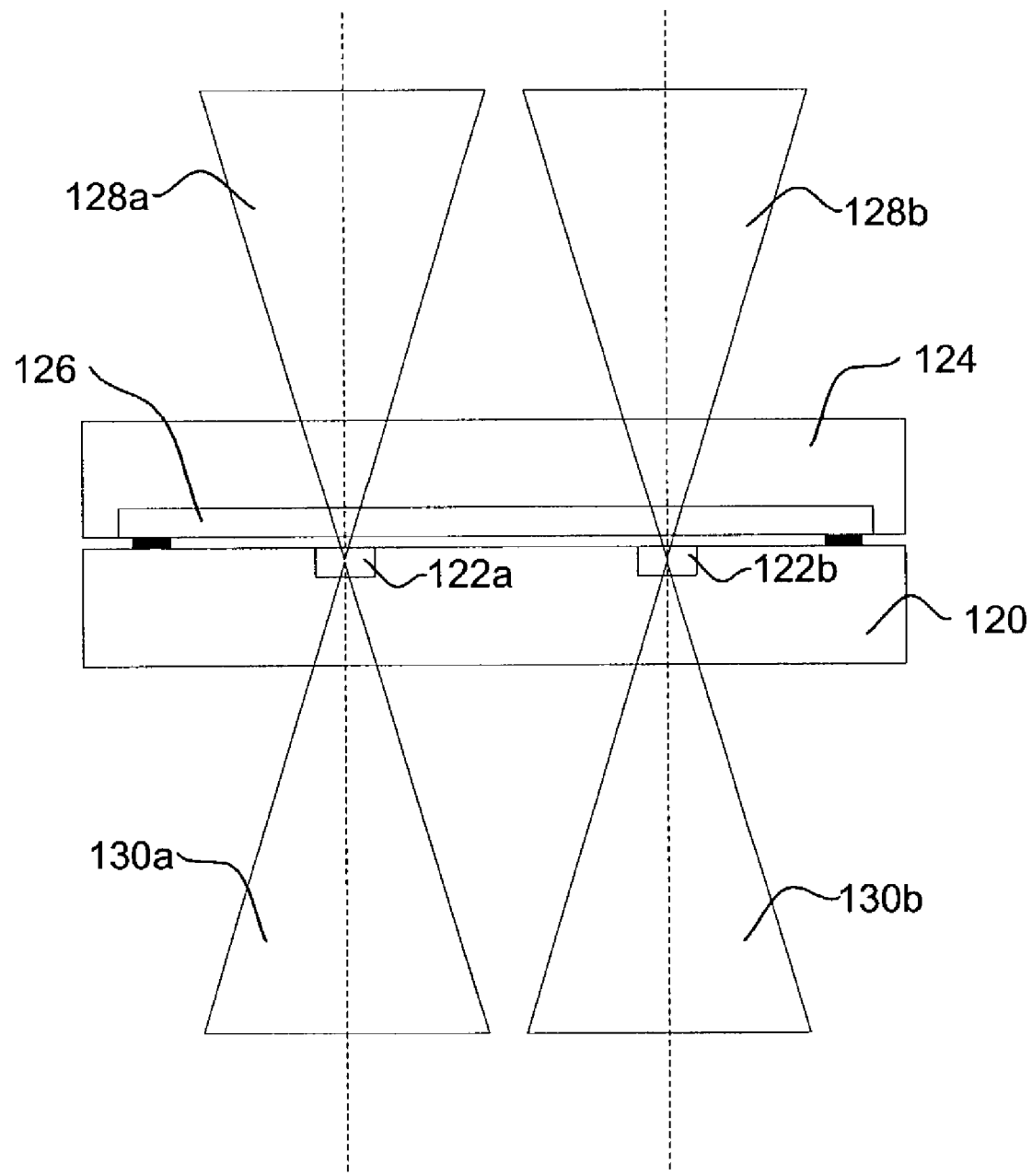
FIG. 6 is a schematic cross-sectional side view of another illustrative embodiment of the present invention that includes optical emitters that simultaneously provide an optical signal in two opposing directions.

One such embodiment is shown in FIG. 6. FIG. 6 shows a first substrate 120 having a number of VCSEL devices 122a and 122b. The VCSEL devices 122a and 122b are adapted to provide light in both an upward and downward direction, as shown. A second substrate 124, which includes a RCPD device 126 or other photo detector, is provided adjacent to the first substrate 120. The second substrate 124 is shown flip-chip bonded to the first substrate 120, but this is not required. The RCPD 126 or other photo detector receives the light 128a and 128b that is provided by the VCSEL devices 122a and 122b in one direction (e.g. the upward direction), and monitors the power output of the VCSEL devices 122a and 122b. The light 130a and 130b that is provided in the opposite direction (e.g. in the downward direction) may be used for other purposes, such as being coupled into a light transmitting medium or the like. In this illustrative embodiment, no light director may be needed or even desired. Like above, a single RCPD 126 or other photo detector may include two or more contacts and may receive light from both VCSEL devices 122a and 122b, if desired. By examining the photo induced current in each of the two or more contacts, the power output of the individual VCSEL devices 122a and 122b may be monitored. Alternatively, each VCSEL 122a and 122b may have its own corresponding photo detector on substrate 124, wherein each photo detector monitors the output power of its corresponding VCSEL device. As can be seen, the present invention may be configured to accommodate a wide variety of applications, and this illustrates the flexibility offered by the present invention.

Figure 7:
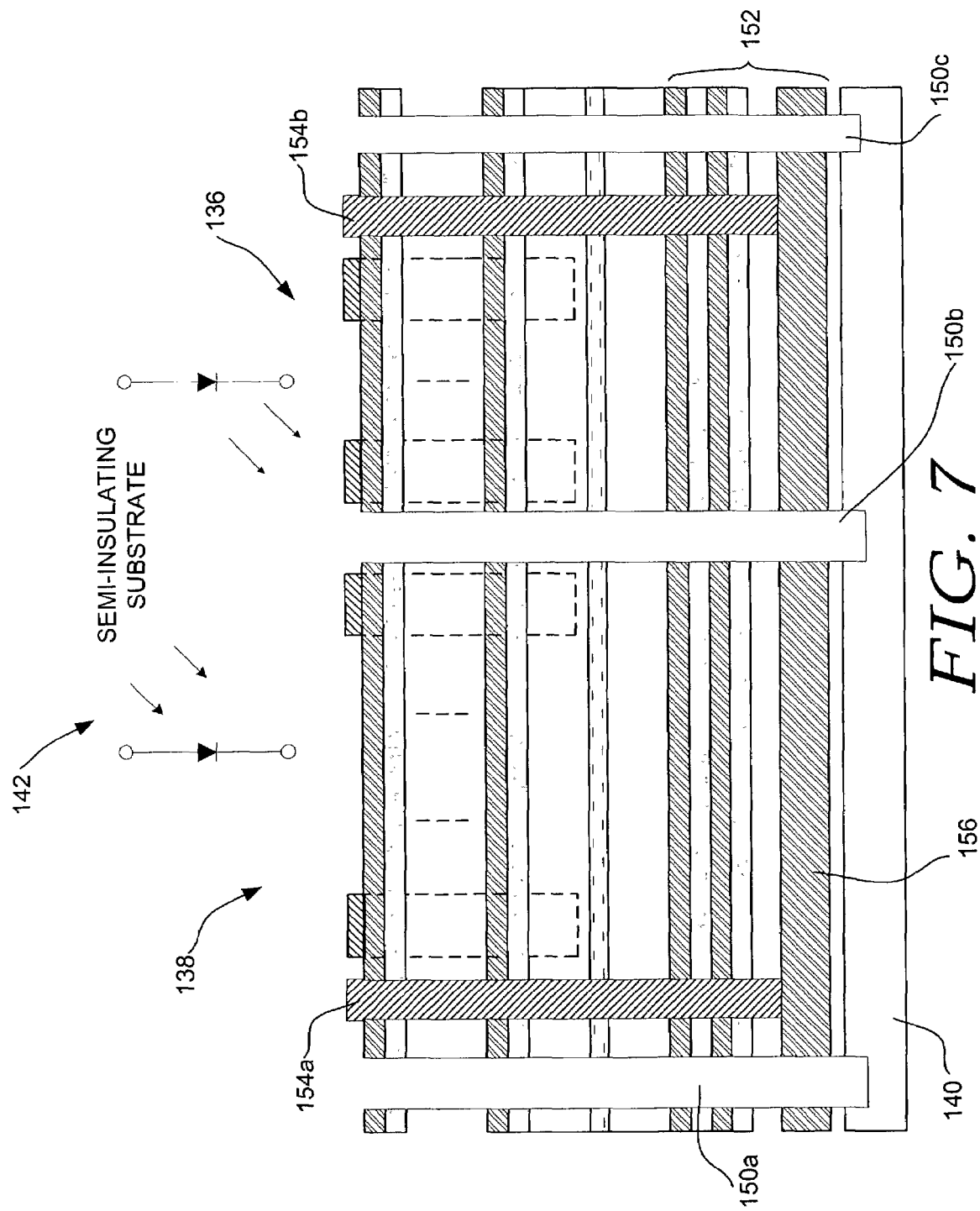
FIG. 7 is a cross-sectional side view of a Vertical Cavity Surface Emitting Laser (VCSEL) and Resonant Cavity Photo Detector (RCPD) formed on a semi-insulating substrate.

FIG. 7 is a cross-sectional side view of a VCSEL 136 and a RCPD 138 formed on a semi-insulating substrate 140. In this illustrative embodiment, isolation regions 150a-150c may extend down into the semi-insulating substrate 140. The isolation regions 150a-150c, in combination with the semi-insulating substrate, may help provide electrical isolation between devices. The isolation regions 150a-150c may be formed by etching a trench or channel, providing a deep H+ implantation, or by using other known techniques.

Since, in the illustrative embodiment, the semi-insulating substrate 140 does not help connect the lower DBR mirror 152 to a bottom or lower contact as in FIG. 5, contacts 154a and 154b may be provided by etching holes or mesas from the top side down to the lower DBR mirror 152. In the illustrative embodiment shown in FIG. 7, holes are etched down to one of the layers 156 in the lower DBR mirror stack. In some cases, this layer may be an extra thick mirror layer as shown, but this is not required. Once the holes are etched, a metal or other conducting layer may be provided to complete an electrical connection from the extra thick lower mirror layer 156 to the top side of the device. FIG. 7 is not to scale, and in practice, the step from the extra thick mirror layer 156 to the top surface of the device is not as severe as shown. When a mesa is provided, a contact pad may be provided on the extra thick mirror layer 156. A wire bond may then be used to connect the contact pad to a package, if desired. Since in this illustrative embodiment the VCSEL and RCPD devices are substantially isolated from one another, the devices may operate completely independent of one another, which may be desirable in some applications.

Rather than using a semi-insulating substrate, it is contemplated that a non-conducting layer may be interposed between a conducting substrate and the lower DBR mirror. The non-conducting layer may be any suitable layer or layers including one or more non-conducting semi-conductor layers, such as a number of mirror periods doped with iron or another element which renders them non-conductive. The VCSEL and RCPD devices may be monolithically formed, as described above, on the non-conducting layer. Like above, an etching or implant process or the like may be used to selectively etch isolation regions 150a-150c between devices.

Figure 8:
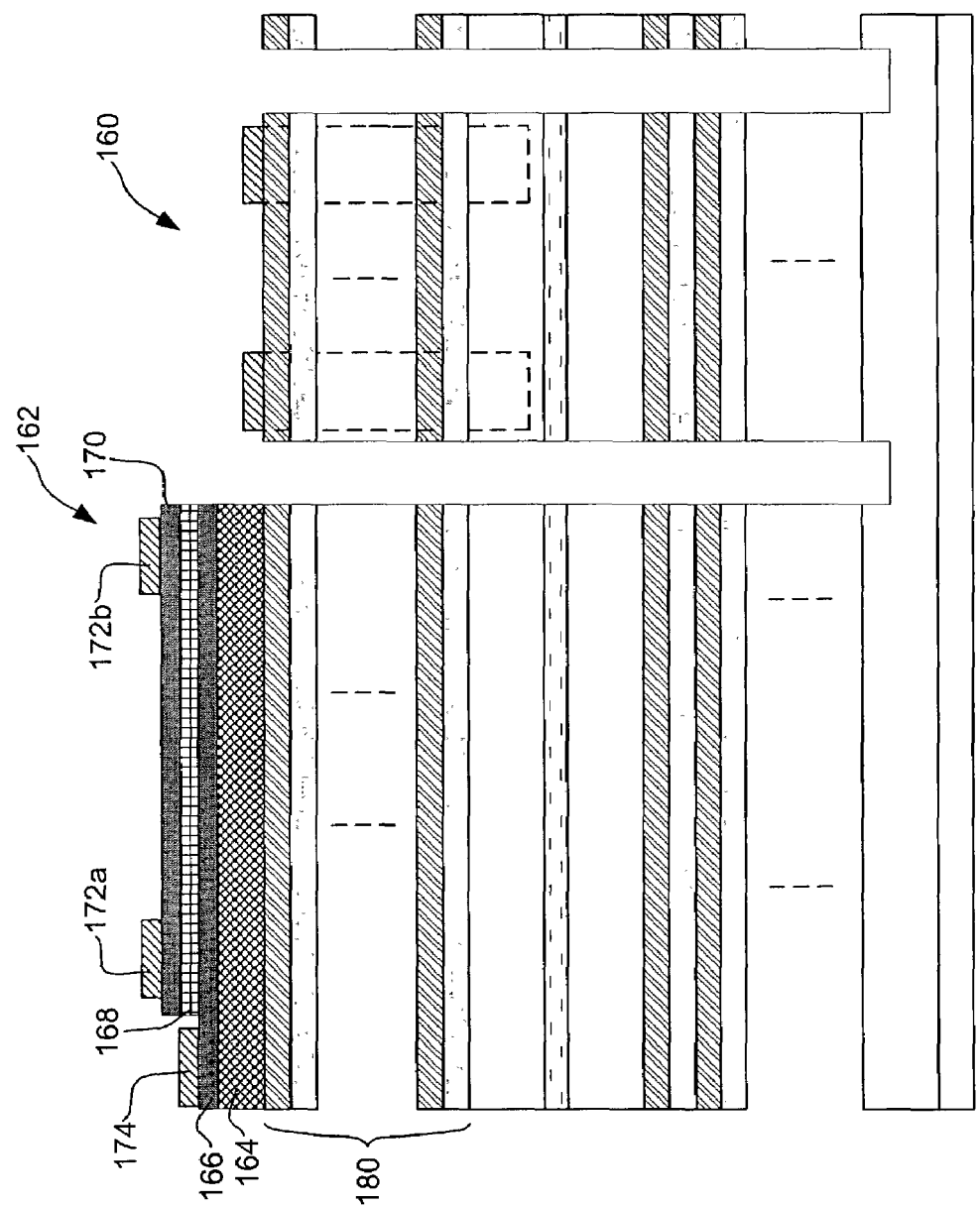
FIG. 8 is a cross-sectional side view of a Vertical Cavity Surface Emitting Laser (VCSEL) and PIN diode formed on a common substrate.

FIG. 8 is a cross-sectional side view of a VCSEL 160 and PIN photo detector 162 formed on a common substrate. This embodiment is similar to that shown and described with respect to FIG. 5. However, rather than providing a RCPD device, the illustrative embodiment provides a PIN photo detector 162 on top of the top DBR mirror. In the illustrative embodiment, a buffer layer 164 is grown or deposited on top of the top DBR mirror 180. Next, a layer 166 having a first conductivity type (e.g. n-type), is provided over the buffer layer 164, followed by an intrinsic (I) layer 168, and then followed by a layer 170 of a second conductivity type (e.g. p-type). Layers 168 and 170 may be etched down to layer 166, and a contact may be provided on layer 166. Two or more spaced contacts, such as contacts 172a and 172b, may be provided on layer 166, as shown. While this embodiment shows a PIN photo detector 162 formed above the top DBR mirror, it is contemplated that any suitable photo detector may be used.

Figure 9:
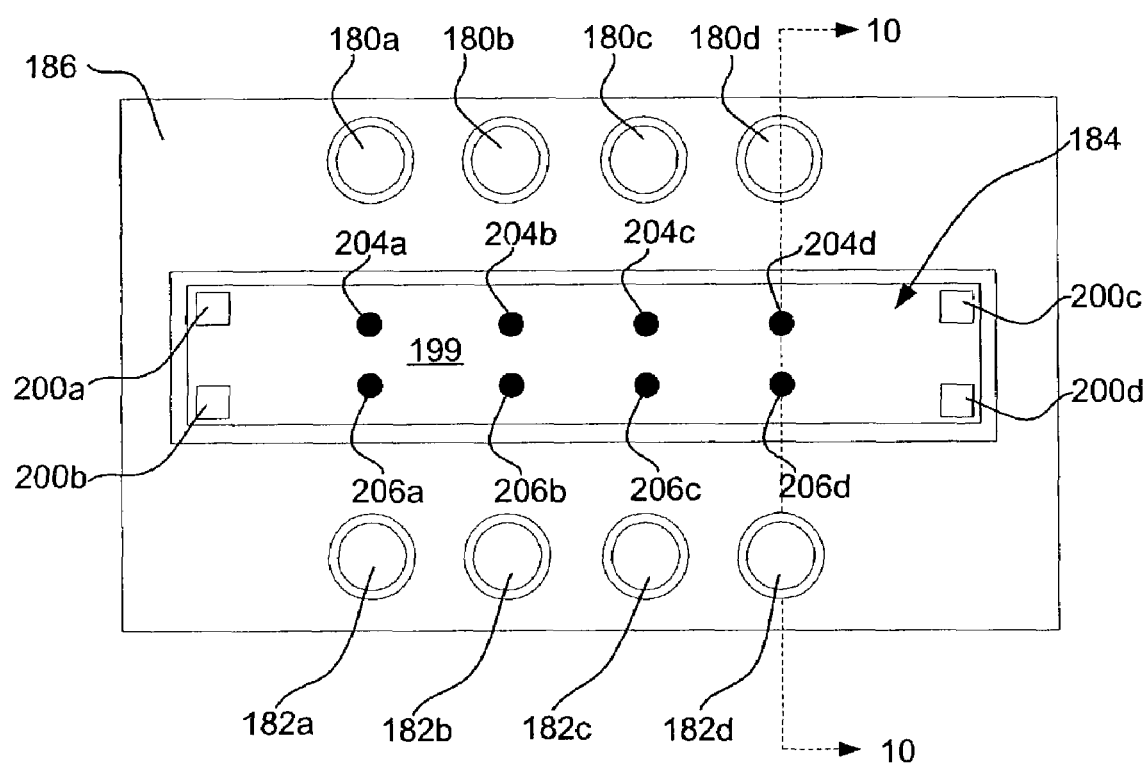
FIG. 9 is a top view of two linear arrays of optical emitters and an elongated photo detector in accordance with another illustrative embodiment of the present invention.
Figure 10:
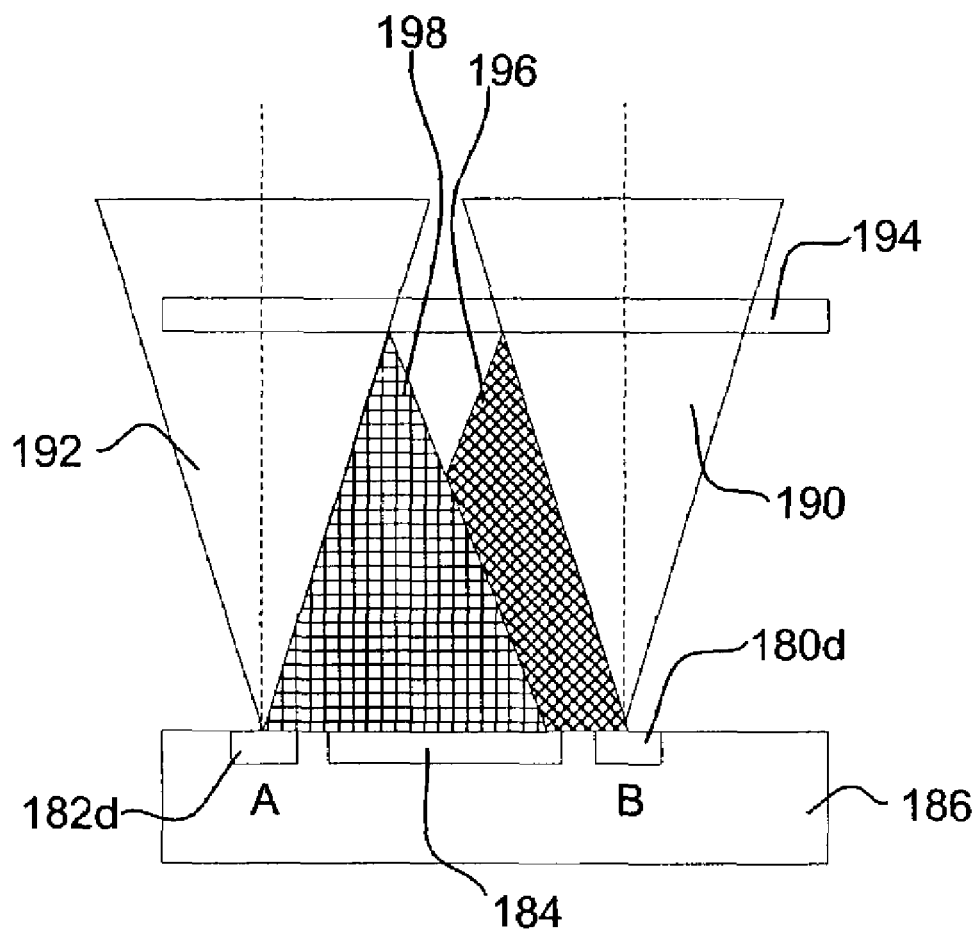
FIG. 10 is a schematic cross-sectional side view of the illustrative embodiment of FIG. 9 taken along line $10-10$.

FIG. 9 is a top view of two arrays of optical emitters 180a-180d and 182a-182d, and an elongated photo detector 184 in accordance with another illustrative embodiment of the present invention. FIG. 10 is a schematic cross-sectional side view of the illustrative embodiment of FIG. 9 taken along line 10-10. In the illustrative embodiment, the two array of optical emitters 180a-180d and 182a-182d, and the elongated photo detector 184 are situated on a common substrate 186, but this is not required.

During use, each of the optical emitters 180a-180d and 182a-182d may produce an optical signal 190 and 192 in a vertical direction (i.e. out of the paper). As best shown in FIG. 10, a light director 194 may be positioned above the substrate 186 to direct at least a portion 196 and 198 of each of the optical signals 190 and 192, respectively, back toward the photo detector 184. The light director 194 may include, for example, a partially or fully reflective mirror, a light diffraction element, and/or any other suitable light directing element or elements as desired. In the illustrative embodiment, the light director 194 is a partially reflective mirror, which allows the remaining portion of the optical signals 190 and 192 to pass through the light director 194 to, for example, a light transmitting medium (not shown) or the like. In some embodiments, the surface of a light transmitting medium itself may serve as the light director 194. In any event, it is recognized that any suitable light director configuration may be used in the illustrative embodiment. In other embodiments, a light director may not be required or even desired.

The photo detector 184 may be, for example, an elongated PIN type diode or any other suitable photo detector. Preferably, the photo detector 184 includes a photo sensitive region 199 with two or more spaced contacts electrically connected to the photo sensitive region 199, such as contacts 200a-200d. In the illustrative embodiment, the photo detector 184 includes a PIN junction, with contacts 200a-200d electrically connected to one side (e.g. the top side) of the PIN junction, and at least one other contact (not shown in FIG. 9) electrically connected to the other side (e.g. bottom side) of the PIN junction.

In the illustrative embodiment, each of the optical signals 190 and 192 provided by the optical emitters 180a-180d and 182a-182d is primarily directed at a different region of the photo-sensitive area 199 of the photo detector 184. The electrical resistance of the PIN diode structure between the various regions of the photo sensitive area 199 to each of the contacts 200a-200d may be different, which may cause the photo currents produced by each of the optical signals 190 and 192 to contribute differently to the photo currents passing through each of the contacts 200a-200d.

Figure 11:
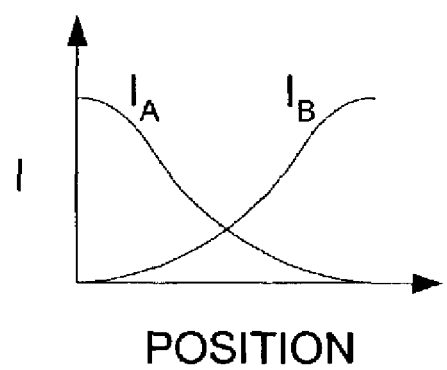
FIG. 11 is a graph showing illustrative light intensities across the light detector of FIG. 10.

Each of the optical signals 190 and 192 provided by the optical emitters 180a-180d and 182a-182d may be provided to discrete non-overlapping regions of the photo-sensitive area 199, such as discrete regions 204a-204d and 206a-206d, respectively, shown in FIG. 9. Alternatively, each of the optical signals 190 and 192 provided by the optical emitters 180a-180d and 182a-182d may be provided to overlapping regions in the photo-sensitive area 184, as best shown in FIGS. 10-11. FIG. 11 is a graph showing illustrative light intensities across the light detector of FIG. 10 when the optical signals 190 and 192 are provided to overlapping regions in the photo-sensitive area 184. In the illustrative embodiment, the portion 198 of the optical signal 192 that is reflected back toward the photo detector 184 has a highest intensity near optical emitter 182d, with diminishing intensity toward optical emitter 180d. This is illustrated by the $I_A$ curve in FIG. 11. Likewise, the portion 196 of the optical signal 190 that is reflected back toward the photo detector 184 has a highest intensity near optical emitter 180d, with diminishing intensity toward optical emitter 182d. This is illustrated by the $I_B$ curve in FIG. 11. As can be seen, each of the optical signals 190 and 192 may be primarily directed at a different region of the photo-sensitive area 199 of the photo detector 184, but may have some overlap.

Because each of the optical signals is primarily directed at a different region of the photo-sensitive area 199 of the photo detector 184, the electrical resistance of the photo detector 184 may cause a different proportion or ratio of photo current that is produced by each of the optical signals to flow through contacts 200a-200d. For example, and referring back to FIG. 9, the photo current produced in region 204a will tend to flow, from most to least, through contacts 200a, 200b, 200c and 200d. Likewise, the photo current produced in region 206a will tend to flow, from most to least, through contacts 200b, 200a, 200d and 200c.

Like above, a controller may be provided for receiving a measure of the photo induced current that passes through contacts 200a, 200b, 200c and 200d, and from that, determine a measure of the optical power produced by each of the optical emitters 180a-180d and 182a-182d. This may be accomplished by, for example, calculating one or more differences and/or ratios of the photo induced currents flowing through contacts 200a, 200b, 200c and 200d, and then correlating these differences and/or ratios to identify which optical emitter(s) experienced a power change, and the extent of the power change. The controller may adjust the optical power of selected optical emitters 180a-180d and 182a-182d to keep the optical power of each of the optical emitters 180a-180d and 182a-182d within a predetermined range.

Alternatively, or in addition, the controller may analyze the total current that passes through the contacts 200a, 200b, 200c and 200d to determine the total or collective power of all of the optical emitters 180a-180d and 182a-182d. The total current passing through the at least one other contact (not shown) that is electrically connected to the other side (e.g. bottom side) of the PIN junction may also be used. In any event, the total current may be used to, for example, identify global changes in output power of all optical emitters 180a-180d and 182a-182d. Global changes in output power may occur when, for example, a temperature change occurs affecting the output performance of all optical emitters 180a-180d and 182a-182d. In some cases, the controller may adjust the optical power of all optical emitters 180a-180d and 182a-182d so that their optical power remains within a predetermined range. As can be seen, a single photo detector may be used to monitor the optical power output of several optical emitters, which may significantly reduce the size, power and/or cost of a system.

Figure 12:
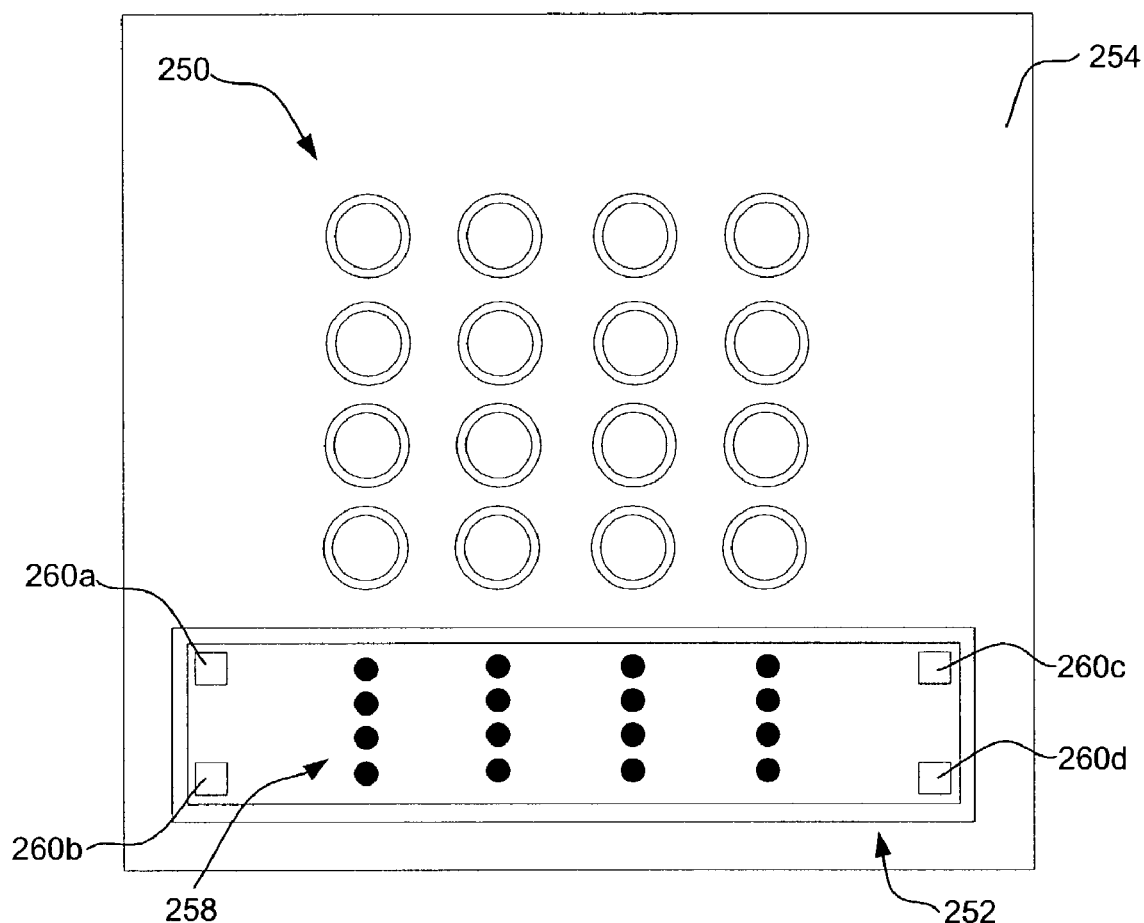
FIG. 12 is a top view of a two-dimensional array of optical emitters and an elongated photo detector in accordance with yet another illustrative embodiment of the present invention.

FIG. 12 is a top view of a two-dimensional array of optical emitters and an elongated photo detector in accordance with yet another illustrative embodiment of the present invention. In the illustrative embodiment, the two-dimensional array of optical emitters generally shown at 250. The optical emitters 250 and the elongated photo detector 252 may be situated on a common substrate 254, but this is not required.

During use, each of the optical emitters 250 may produce an optical signal in a vertical direction (i.e. out of the paper). A light director (not shown) may be positioned above the substrate 254 to direct at least a portion of each of the optical signals back toward the photo detector 252. In the illustrative embodiment, portions of the optical signals 250 are primarily directed to regions indicated with black dots, which are generally shown at 258.

Like above, the electrical resistance of the photo-diode 252 from the various regions 258 to each of the contacts 260a-260d may be different, which may cause the photo currents produced by each of the optical emitters 250 to contribute differently to the photo currents passing through each of the contacts 260a-260d. A controller may be provided for receiving a measure of the photo induced current that pass through contacts 260a-260d, and determine a measure of the optical power produced by each of the optical emitters 250 in the two dimensional array. The controller may adjust the optical power of selected optical emitters 250 to keep the optical power of each of the optical emitters 250 within a predetermined range.

Alternatively, or in addition, the controller may analyze the total current that passes through the contacts 260a-260d to determine the total or collective power of all of the optical emitters 250. The total current may be used to, for example, identify global changes in output power of all optical emitters 250. Global changes in output power may occur when, for example, a temperature change occurs affecting the output performance of all optical emitters 250. In some cases, the controller may adjust the optical power of all optical emitters 250 so that their optical power remains within a predetermined range. As can be seen, a single photo detector 252 may be used to monitor the optical power output of a two dimensional array of optical emitters 250, which may significantly reduce the size, power and/or cost of a system.

Having thus described the preferred embodiments of the present invention, those of skill in the art will readily appreciate that the teachings found herein may be applied to yet other embodiments within the scope of the claims hereto attached, including but not limited to, a wide range of alternative materials composed of combinations of elements from columns three and five of the periodic table.

What is claimed is:

1. An optical system, comprising:
    a photo detector having two opposing sides with a junction therebetween, and a photo sensitive region;
    two or more contacts electrically coupled to the same side of the photo detector; and
    two or more optical emitters, each optical emitter producing an optical signal, the photo detector receiving the two or more optical signals such that each of the optical signals is primarily received by a different respective portion of the photo sensitive region of the photo detector.

2. The optical system according to claim 1 further comprising:
    a controller coupled to the two or more contacts of the photo detector for determining a measure of the optical power of each of the two or more optical signals.

3. An optical system according to claim 2 wherein the controller determines a measure of the optical power of a particular optical signal.

4. An optical system according to claim 2 wherein the controller determines a measure of the collective optical power of the two or more optical signals.

5. An optical system, comprising:
    two or more optical emitters, each producing an optical signal;
    a photo detector having a photo sensitive region;
    directing means for directing at least a portion of each of the two or more optical signals primarily at different respective portions of the photo sensitive region of the photo detector; and
    a controller coupled to the photo detector for determining a measure of the optical power of the two or more optical signals.

6. An optical system according to claim 5 wherein the controller determines a measure of the optical power of a particular optical signal.

7. An optical system according to claim 5 wherein the controller determines a measure of the collective optical power of the two or more optical signals.

8. An optical system according to claim 5 wherein the controller includes means for adjusting the optical power of the two or more optical emitters so that the optical power of each of the optical signals remains within a predetermined range.

9. An optical system according to claim 5 wherein the two or more optical emitters and the photo detector are situated in or on a common substrate.

10. An optical system according to claim 5 wherein the photo detector includes a first layer with a first conductivity type, a second layer with a second conductivity type, and two or more contacts where each of the contacts is electrically connected to a different location of the first layer.

11. An optical system according to claim 10 wherein the different locations of the first layer are spaced from one another, and wherein the first layer has a resistance.

12. An optical system according to claim 11 wherein the resistance between the two or more contacts and the different respective portions of the photo sensitive region that the two or more optical signals are primarily directed toward is different so that each of the two or more optical signals produces a different photo induced current through the two or more contacts.

13. An optical system according to claim 12 wherein the controller determines a measure of optical power of at least selected optical signals from a difference or a ratio in the photo induced current through the two or more contacts.

14. An optical system according to claim 12 wherein the controller determines if the selected optical signals cumulatively experienced a power change from the total photo induced current through the two or more contacts.

15. An optical power monitor for monitoring the power of two or more optical signals, the optical power monitor comprising:
    a photo-detector having a photo-sensitive area, the photo-detector having a first layer with a first conductivity type, a second layer with a second conductivity type, and two or more contacts electrically coupled to a different location of the first layer; and
    directing means for directing at least a portion of each of the two or more optical signals primarily toward different respective portions of the photo-sensitive area of the photo-detector, each of the two or more optical signals producing a photo induced current in each of the two or more contacts.

16. An optical power monitor according to claim 15 further comprising:
a controller coupled to the two or more contacts for determining a measure of the optical power of one or more of the optical signals.

17. An optical power monitor according to claim 15 wherein the different areas substantially overlap one another.

18. An optical power monitor according to claim 15 wherein the different areas do not substantially overlap one another.

19. An optical power monitor according to claim 16 wherein the controller determines a measure of the optical power of a particular optical signal from a measure of a difference or a ratio of the photo induced current through the two or more contacts.

20. An optical power monitor according to claim 19 wherein the controller includes means for adjusting the optical power of the optical signals so that the optical power of each of the optical signals remain within a predetermined range.

21. An optical power monitor according to claim 16 wherein the controller determines a measure of the collective optical power of the two or more optical signals from a measure of the total photo induced currents through the two or more contacts.

* * * * *